United States Patent
Hamada et al.

[11] Patent Number: 5,359,000
[45] Date of Patent: Oct. 25, 1994

[54] GOLF BALL

[75] Inventors: Akihiko Hamada, Kakogawa; Kuniyasu Horiuchi, Kobe; Akira Kato, Nishinomiya, all of Japan

[73] Assignee: Sumitomo Rubber Industries, Ltd., Kyogo, Japan

[21] Appl. No.: 950,685

[22] Filed: Sep. 25, 1992

[30] Foreign Application Priority Data

Sep. 25, 1991 [JP] Japan .................. 3-274582

[51] Int. Cl.$^5$ ................. C08L 23/26; A63B 37/12
[52] U.S. Cl. ........................ 525/74; 525/195; 525/196; 525/207; 273/235 R; 524/908; 260/998.14
[58] Field of Search ............. 525/74, 207, 195, 196, 525/221, 330.2, 201; 524/908; 273/235 R; 260/998.14

[56] References Cited

U.S. PATENT DOCUMENTS

| | | | |
|---|---|---|---|
| 3,384,612 | 5/1968 | Brandt et al. | 524/908 |
| 3,437,718 | 4/1969 | Rees | 525/221 |
| 3,454,676 | 7/1969 | Busse | 525/330.2 |
| 3,649,578 | 3/1972 | Bush et al. | 525/221 |
| 3,789,035 | 1/1974 | Iwami et al. | 525/196 |
| 4,526,375 | 2/1985 | Nakade | 525/201 |
| 4,567,219 | 1/1986 | Tominaga et al. | 524/413 |
| 4,766,174 | 8/1988 | Statz | 525/195 |
| 4,884,814 | 12/1989 | Sullivan | 525/196 |
| 4,956,414 | 9/1990 | Muehlenbernd et al. | 525/201 |
| 4,986,545 | 1/1991 | Sullivan | 524/908 |
| 5,098,105 | 3/1992 | Sullivan | 525/74 |

FOREIGN PATENT DOCUMENTS 49-49727  5/1974  Japan .
1383422   5/1972  United Kingdom .

*Primary Examiner*—Carman J. Seccuro, Jr.
*Attorney, Agent, or Firm*—Birch, Stewart, Kolasch & Birch

[57] ABSTRACT

The present invention provides a golf ball having excellent hit feeling and control property as well as satisfactory flying performance and cut resistance, which comprises a core and a cover for covering the core. The cover is prepared from a heated mixture of the following three components:

(A) an ionomer resin;

(B) a polymer containing at least maleic anhydride as one constituent component; and (C) a metal salt selected from the group consisting of metal hydroxides, metal carbonates or metal acetates.

9 Claims, No Drawings

1

GOLF BALL

BACKGROUND OF THE INVENTION

1. Field of the Invention

The present invention relates to a golf ball with a cover wherein hit feeling and control property of the golf ball are improved.

2. Description of the Related Art

As a cover material of a golf ball, an ionomer resin has widely been used (e.g. Japanese Patent Kokai No. 49-49727, etc.), heretofore. Particularly, in almost all of two-piece golf balls using a solid core, the ionomer resin is used as a cover material.

The reason for this is that the ionomer resin is superior in durability, cut resistance and impact resilience and is easily processed. Furthermore, the Ionomer resin is cheap in comparison with other cover materials.

However, since the ionomer resin has very high hardness and stiffness, it is inferior in hit feeling and control property (easy spinning) in comparison with balata (transpolyisoprene), which is used as a cover base of a thread wound golf ball.

As a result, attempts to improving hit feeling and control property have been made by softening the ionomer resin with various means, however, satisfactory results are not obtained at present.

SUMMARY OF THE INVENTION

In order to improve both hit feeling and flying performance, the present inventors have intensively studied about the cover material. As a result, it has been found that a golf ball having excellent hit feeling and control property, as well as satisfactory flying performance and cut resistance, can be obtained by using a cover material composed of a heated mixture of the following three components:

(A) an ionomer resin;

(B) a polymer containing at least maleic anhydride as one constituent component; and (C) a metal salt selected from the group consisting of metal hydroxides, metal carbonates and metal acetates, and the present invention has been completed.

The main object of the present invention is to provide a golf ball having excellent hit feeling and control property as well as satisfactory flying performance and cut resistance.

This object, as well as other objects and advantages of the present invention, will become apparent to those skilled in the art from the following description.

According to the present invention, there is provided a golf ball comprising a core and a cover for covering the core, said cover being composed of a heated mixture of the following three components:

(A) an ionomer resin;

(B) a polymer containing at least maleic arthydride as one constituent component; and (C) a metal salt selected from the group consisting of metal hydroxides, metal carbonates or metal acetates.

That is, by mixing the polymer containing maleic anhydride as one constituent component with the ionomer resin with heating, the ionomer resin is softened, whereby, hit feeling and control property are improved. Furthermore, the strength of the heated mixture is increased by a crosslinking effect due to the addition of the above metal salt, and deterioration of excellent properties of the ionomer resin is prevented, so that, hit feeling and cut resistance are satisfactorily maintained.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DETAILED DESCRIPTION OF THE INVENTION

The ionomer resin is a copolymer of 10 to 20 % by weight of α, β-unsaturated carboxylic acid having 3 to 8 carbon atoms with 80 to 90 % by weight of α-olefin, a part of a carboxyl group in said copolymer being neutralized with a metal ion.

In the present invention, the ionomer resin can be any one, which is used for the cover of the golf ball, and one or more sorts of them can be used in combination. Representative examples of the ionomer resins are the ionic ethylene-methacrylic acid copolymer based ionomer resin include HI-MILAN 1605 (of the type neutralized by sodium ion), HI-MILAN 1706 (of the type neutralized by zinc ion), HI-MILAN 1707 (of the type neutralized by sodium ion), HI-MILAN 1705 (of the type neutralized by zinc ion) which are commercially available from Mitsui Du Pont Polychemicals Co.; SURLYN 7930 (of the type neutralized by lithium ion), SURLYN 7940 (of the type neutralized by lithium ion) which are commercially available from Du Pont de Nemours & Co. and the like. The ionic ethylene-acrylic acid copolymer based ionomer resin include one that is commercially available from EXXON Chemicals Co. under the trade name IOTEK.

As the polymer containing at least maleic anhydride as one constituent component, there can be used various forms of polymers, for example, modified types wherein maleic acid is added to a polymer main chain, copolymer types containing maleic anhydride as a copolymeric component, and the like.

Among these types of polymer, it is preferred that the polymer backbone is formed from an α-olefin as a main monomer. These polymers have excellent compatibility with the ionomer resin and, therefore, are particularly suitably used in the present invention. Examples of such polymers include maleic anhydride-modified ethylene-propylene copolymer, maleic anhydride-modified ethylene-propylene-diene monomer terpolymer, maleic anhydride-modified polyethylene, maleic anhydride-modified EPDM rubber, maleic anhydride-modified polypropylene, ethylene-ethyl acrylate-maleic anhydride terpolymer, and the like.

The polymer containing maleic anhydride as one constituent component has elastomeric properties and is superior in processability, thermostability and compatibility with the ionomer resin, and it softens the ionomer resin to impart flexibility to the mixture.

Since the polymer containing maleic anhyride as one constituent component is used for the purpose of imparting flexibility, as described above, those having low stiffness modulus in comparison with a normal ionomer resin are preferred. Particularly, those having stiffness modulus of not more than 2000 kgf/cm$^2$, preferably about 50 to 1000 kgf/cm$^2$ are preferred. When the stiffness modulus exceeds 2000 kgf/cm$^2$, it becomes equal to that of the ionomer resin (generally, 2500 to 4000 kgf/cm$^2$) and it becomes impossible to soft the ionomer resin.

In the present invention, by adding the component (C) (i.e. metal hydroxides, metal carbonates or metal acetates) to the resin component of two sorts of resins and mixing them with heating, residual carboxyl groups in the ionomer resin and carboxylic anhydride in the polymer containing maleic anhydride as one constituent component are reacted with the metal salt, thereby forming cocross-linkage between the ionomer resin and the polymer containing maleic anhydride as one constituent component, due to the metal Ion, which results in an improvement of strength.

Examples of the metal in the above component (C) include alkaline metals such as lithium, sodium, potassium, etc.; alkaline earth metals such as magnesium, calcium, barium, etc.; transition metals such as zinc, copper, iron, nickel, etc. Representative examples of the metal hydroxides, metal carbonates and metal acetate are magnesium hydroxide, basic magnesium carbonate, magnesium acetate, basic zinc carbonate, zinc acetate, sodium carbonate, lithium carbonate, copper hydroxide, calcium hydroxide and the like.

In the three-component mixture constituting the cover base, a weight ratio of the ionomer resin (A) To the polymer containing maleic anhydride as one constituent component (B) is preferably 95:5 to 30:70. When the amount of the ionomer resin (A) is more than the above range, the amount of the polymer containing maleic anhydride as one constituent component is small and, therefore, a sufficient effect of softening the heated mixture is not obtained, so that a sufficient effect of improving hit feeling and control property of the golf ball is not obtained. Further, when the amount of the ionomer resin (A) is less than the above range, impact resilience and cut resistance of the ionomer resin are deteriorated, so that flying performance and cut resistance of the golf ball are lowered.

The amount of the metal salt (C) is preferably 0.2 to 3 parts by weight based on 100 parts by weight of the resin component comprising the ionomer resin (A) and the polymer containing maleic anhydride as one constituent component (B). When the amount of the metal salt (C) is less than 0.2 part by weight based on 100 parts of the resin component (A)+(B), the amount of cocross-linkage formed due to the metal ion becomes small and, therefore, insufficient modification effect is obtained. When the amount of the metal salt (C) is more than 3 parts by weight based on 100 parts by weight of the resin component (A)+(B), the amount of cocross-linkage formed due to the metal ion becomes excessive and, therefore, fluidity of the mixture is decreased, which results in deterioration of processability.

In the present invention, a heated mixture comprising an ionomer resin (A), a polymer containing maleic anhyride as one constituent component (B), and a metal salt (C) is used as a main component of the base for the cover. To the heated mixture, if necessary, various additives such as pigments, dispersants, antioxidants, UV absorbers, UV stabilizers and the like can be added.

Further, in the present invention, the fact that a heated mixture of three components, an ionomer resin (A), a polymer containing maleic anhyride as one constituent component (B) and a metal salt (C) is used as a main component of the base for the cover means that the base for the cover is only composed of the above heated mixture, or that the base for the cover is composed of the heated mixture, to which other resins are added in an amount which does not affect properties of the heated mixture (normally, in the range of not more than 20% by weight based on the total weight of the heated mixture).

The above ionomer resin, polymer containing maleic anhydride as one constituent component and metal salt are mixed together with heating at a resin temperature of 150° to 280° C., using an extruder for plastic or an internal mixer such as plastmill, banbury mixer and the like.

In order to conduct the above mixing uniformly and efficiently, it is most suitable to use a biaxial kneading type extruder among the above mixers.

A cover composition containing the heated mixture as the main component of the cover material is then coated on the core to obtain a golf ball.

Either a solid core or a thread wound core can be used. The solid core is obtained by vulcanizing (cross-linking) a rubber composition mainly composed of a base rubber, followed by integral molding. The thread wound core is obtained by winding a thread rubber on a core material.

According to the present invention, there is provided a golf ball having excellent hit feeling and control property, as well as satisfactory flying performance and cut resistance.

The following Examples further illustrate the present invention in detail but are not to be construed to limit the scope thereof.

EXAMPLES 1 TO 3 AND COMPARATIVE EXAMPLES 1 TO 4

(1) Preparation of core

A rubber composition obtained by adding 35 parts by weight of zinc acrylate, 20 parts by weight of zinc oxide, 1 part by weight of dicumyl peroxide and 0.05 parts by weight of antioxidant [YOSHINOX 425 (trade name), manufactured by Yoshitomi Seiyaku K. K.] to 100 parts by weight of polybutadiene rubber [BR-11 (trade name), manufactured by Nippon Gosei Gomu K. K.] was vulcanized and molded at 165° C. for 20 minutes to obtain a solid core. The average diameter of the resulting solid core was 38.4 mm.

(2) Preparation of cover composition

Formulation components shown in Tables 1 and 2 were mixed and extruded by a twin-screw kneading type extruder to obtain a pellet-like cover composition. Further, formulations of Preparation Examples 1 to 3 are shown in Table 1 and those of Preparation Comparative Examples 1 to 4 are shown in Table 2, respectively.

The extrusion was conducted under the conditions of a screw diameter of 45 rnm, a screw revolution speed of 200 rpm and a screw L/D of 35. The temperature was 220° to 260° C.

Further, formulation components shown in Table are the same as those shown in Table 2 and, therefore, they will be explained only in Table 1.

TABLE 1

|  | Preparation Example No. | | |
|---|---|---|---|
|  | 1 | 2 | 3 |
| HI-MILAN 1605[1)] | 80 | 80 | 80 |
| EXXELOR VA1803[2)] | 20 | 0 | 0 |
| BONDINE AX8390[3)] | 0 | 20 | 0 |
| BONDINE TX8030[4)] | 0 | 0 | 20 |

TABLE 1-continued

| | Preparation Example No. | | |
|---|---|---|---|
| | 1 | 2 | 3 |
| Magnesium hydroxide | 0.7 | 0.7 | 0.7 |
| Titanium oxide | 1.0 | 1.0 | 1.0 |

1) Ionomer resin of the type neutralized by sodium ion manufactured by Mitsui Du Pont Polychemicals Co. (melt index: 2.8; stiffness modulus: about 31000 kgf/cm$^2$)
2) Maleic anhydride-modified ethylene-propylene copolymer manufactured by EXXON Chemicals Co. (melt flow rate: 2.16 kg/230° C.; stiffness modulus: <500 kgf/cm$^2$; maleic anhydride content: 0.7%)
3) Ethylene-ethyl acrylate-maleic anhydride terpolymer manufactured by Sumitomo Chemicals Co. [melt index: 7.0; stiffness modulus: <100 kgf/cm$^2$; (ethylene acrylate + maleic anhydride) content: 32% (maleic anhydride: 1 to 4%)]
4) Ethylene-ethyl acrylate-maleic anhydride terpolymer manufactured by Sumitomo Chemicals Co. [melt index: 3.0; stiffness modulus: <500 kgf/cm$^2$; (ethylene acrylate + maleic anhydride) content: 15% (maleic anhydride: 1 to 4%)]

TABLE 2

| | Preparation Comparative Example No. | | | |
|---|---|---|---|---|
| | 1 | 2 | 3 | 4 |
| HI-MILAN 1605 | 100 | 80 | 80 | 80 |
| EXXELOR VA1803 | 0 | 20 | 0 | 0 |
| BONDINE AX8390 | 0 | 0 | 20 | 0 |
| BONDINE TX8030 | 0 | 0 | 0 | 20 |
| Magnesium hydroxide | 0 | 0 | 0 | 0 |
| Titanium oxide | 1.0 | 1.0 | 1.0 | 1.0 |

(3) Preparation of golf ball

The core prepared in the above item (1) was coated with the cover composition prepared in the above item (2) by an injection molding method to obtain a golf ball.

The ball weight, ball compression, ball initial velocity and the flying distance of the resulting golf ball were measured. The ball compression was measured by the PGA system, and the ball initial velocity was measured by the R & A initial velocity measuring method. Further, the flying distance was measured by hitting a golf ball with a No. 1 wood golf club at a club-head speed of 45 m/second, using a swing-robot manufactured by True Temper Co.

In Table 3, ball weight, ball compression, ball initial velocity, flying distance and kinds of cover composition used in the production of the golf balls of Examples 1 to 3 are shown. In Table 4, ball compression, ball initial velocity, flying distance and kinds of cover composition used in the production of the golf balls of Comparative Examples 1 to 4 are shown. The cover compositions are respectively shown by the Preparation Example No. and the Comparative Examples No. The golf ball of Comparative Example 1 is a golf ball wherein the ionomer resin is used alone as the resin component for the cover.

TABLE 3

| | Example No. | | |
|---|---|---|---|
| | 1 | 2 | 3 |
| Cover composition | *1 | *2 | *3 |
| Ball weight (g) | 45.2 | 45.4 | 45.4 |
| Ball compression | 91 | 90 | 94 |
| Ball initial velocity (feet/second) | 252.5 | 252.3 | 252.6 |
| Flying distance (yard) | 228 | 227 | 229 |

*1: Preparation Example 1
*2: Preparation Example 2
*3: Preparation Example 3

TABLE 4

| | Comparative Example No. | | | |
|---|---|---|---|---|
| | 1 | 2 | 3 | 4 |
| Cover composition | *1 | *2 | *3 | *4 |
| Ball weight (g) | 45.4 | 45.2 | 45.4 | 45.4 |
| Ball compression | 102 | 90 | 88 | 92 |
| Ball initial velocity (feet/second) | 252.5 | 251.2 | 250.5 | 251.5 |
| Flying distance (yard) | 228 | 223 | 222 | 224 |

*1: Preparation Comparative Example 1
*2: Preparation Comparative Example 2
*3: Preparation Comparative Example 3
*4: Preparation Comparative Example 4

As is shown in Table 3, regarding the golf balls of Examples 1 to 3, flying distance is 227 to 229 yards and is the same as that of the golf ball of Comparative Example 1 shown in Table 4. Substantial deterioration of flying distance was not observed. By contrast, regarding the golf balls of Comparative Examples 2 to 4, flying distance were about 4 to 6 yard smaller than those of the golf balls of Comparative Example 1, as shown in Table 4.

Further, regarding the golf balls of Examples 1 to 3 and Comparative Examples 1 to 4, ten professional golfers were asked to hit the golf balls and to evaluate the hit feeling, control property and flying distance.

As a result, hit feeling and control property of the golf balls of Examples 1 to 3 were similar to those of a thread wound golf ball coated with a cover mainly composed of transpolyisoprene (balata) and flying distance was also satisfactory.

On the contrary, regarding the golf ball of Comparative Example 1, hit feeling was hard and spinning was hardly obtained and control property was inferior. Regarding the golf balls of Comparative Examples 2 to 4, hit feeling and control property were good, but flying distance was inferior.

Further, in order to evaluate cut resistance of the golf balls of Examples 1 to 3 and Comparative Examples 1 to 4, the top part of the golf ball was hit at a club-head speed of 30 m/second using a swing-robot provided with a pitching wedge manufactured by True Temper Co. to examine whether a cut flaw has arisen or not.

As a result, no cut flaw was found in the golf balls of Examples 1 to 3 and Comparative Example 1. A small cut flaw was found in the golf balls of Comparative Examples 2 to 4.

Further, regarding the thread wound golf ball coated with the cover mainly composed of transpolyisoprene (balata), a very large cut flaw was found after the test was conducted under the same conditions.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A golf ball comprising a core and a cover covering the core, said cover comprising a heated mixture of the following three components:

(A) an ionomer resin comprising a copolymer of 10 to 20% by weight of an $\alpha,\beta$-unsaturated carboxylic acid having 3 to 8 carbon atoms with 80 to 90% by weight of $\alpha$-olefin, at least a portion of the carboxyl groups in said copolymer being neutralized with a metal ion;

(B) a polymer containing at least maleic anhydride as one constituent component, selected from the group consisting of maleic anhydride-modified ethylene-propylene copolymer, maleic anhydride-modified ethylene-propylene-diene monomer terpolymer, maleic anhydride-modified polyethylene, maleic-anhydride modified polypropylene, ethylene-ethyl acrylate-maleic anhydride terpolymer, and mixtures thereof; and (C) a metal salt selected from the group consisting of metal hydroxides, metal carbonates and metal acetates.

2. The golf ball according to claim 1 wherein said ionomer resin (A) is an ionic ethylene-methacrylic acid copolymer based ionomer resin or ionic ethylene-acrylic acid copolymer based ionomer resin.

3. The golf ball according to claim 1 wherein said polymer (B) has stiffness modulus of not more than 2,000 Kgf/cm$^2$.

4. The golf ball according to claim 1 wherein a weight ratio of the ionomer resin (A) to the polymer (B) is within the range of 95:5 to 30:70.

5. The golf ball according to claim 1 wherein said metal salt (C) is present in the mixture in an amount of 0.2 to 3 parts by weight based on 100 parts by weight of the resin component comprising the ionomer resin (A) and the polymer (B).

6. The golf ball according to claim 1, wherein said polymer component (B) has a stiffness modulus of 50 to 2,000 kgf/cm2.

7. The golf ball according to claim 1, wherein said metal in said metal salt is selected from the group consisting of lithium, sodium, potassium, magnesium, calcium, barium, zinc, copper, iron, and nickel.

8. The golf ball according to claim 7, wherein said metal salt is selected from the group consisting of magnesium hydroxide, basic magnesium carbonate, magnesium acetate, basic zinc carbonate, zinc acetate, sodium carbonate, lithium carbonate, copper hydroxide, and calcium hydroxide.

9. The golf ball according to claim 1, wherein said cover further comprises pigments, dispersants, antioxidants, UV absorbers, UV stabilizers, and mixtures thereof.

* * * * *